(12) United States Patent
Chalemin et al.

(10) Patent No.: US 8,106,881 B2
(45) Date of Patent: Jan. 31, 2012

(54) SYSTEM, COMPUTER PROGRAM PRODUCT AND METHOD OF MANIPULATING WINDOWS ON PORTABLE COMPUTING DEVICES THROUGH MOTION

(75) Inventors: Glen Edmond Chalemin, Austin, TX (US); Indran Naick, Cedar Park, TX (US); Clifford Jay Spinac, Austin, TX (US); Calvin Lui Sze, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1119 days.

(21) Appl. No.: 11/936,127

(22) Filed: Nov. 7, 2007

(65) Prior Publication Data

US 2009/0119616 A1    May 7, 2009

(51) Int. Cl.
*G09G 5/00* (2006.01)
(52) U.S. Cl. .......... 345/156; 345/649; 715/788
(58) Field of Classification Search .......... 345/156, 345/649, 689; 361/681–683, 671, 679.01, 361/679.02, 679.21, 679.26, 679.27; 715/700, 715/781, 788
See application file for complete search history.

(56) References Cited

U.S. PATENT DOCUMENTS

| | | | |
|---|---|---|---|
| 4,726,633 A | | 2/1988 | Noble et al. |
| 6,061,064 A | * | 5/2000 | Reichlen .......... 345/418 |
| 6,396,497 B1 | * | 5/2002 | Reichlen .......... 345/427 |
| 7,245,310 B2 | * | 7/2007 | Kawahara et al. .......... 715/782 |
| 2002/0024488 A1 | | 2/2002 | Jemkins et al. |
| 2009/0013282 A1 | * | 1/2009 | Mercer .......... 715/788 |

OTHER PUBLICATIONS

A Passive-Style Buttonless Mobile Terminal, Youichi Horry et al., IEEE Transactions on Consumer Electronics, vol. 49, No. 3, Aug. 1993.
A Tilt Detector (F2007), Hua Zhou, Circuit Cellar Motorola Flash Innovation 2003 Design Contest, Innovate with HC08 from Motorola, Jun. 30, 2003.
Labrynthspel, The Marble Maze Game, A Precision Project for Expert Woodcrafters, Keith Davies, 2004.

* cited by examiner

*Primary Examiner* — Kimnhung Nguyen
(74) *Attorney, Agent, or Firm* — Volel Emile; Robert C. Rolnik; David A. Mims

(57) ABSTRACT

A method by which a user may move windows from one location to another on a screen of a portable computing device is provided. In accordance with the method, when the device is in window manipulation mode, the user needs only tilt the device toward a destination location and the windows are moved toward that location. Tilt detectors in the device sense an angle of tilt and provide the tilt angle as feedback to a processor. The processor, under proper software instructions, moves the windows toward the destination location on the screen based on the tilt angle. The greater the tilt angle, the faster the windows are moved toward the destination location.

18 Claims, 4 Drawing Sheets

SYSTEM, COMPUTER PROGRAM PRODUCT AND METHOD OF MANIPULATING WINDOWS ON PORTABLE COMPUTING DEVICES THROUGH MOTION

BACKGROUND OF THE INVENTION

1. Technical Field

The present invention is generally directed to portable computing devices. More specifically, the present invention is directed toward a system, computer program product and method of manipulating windows on portable computing devices through motion.

2. Description of Related Art

A portable computing device is a small, portable computer that allows one to store, organize and access information. Portable computing devices include personal digital assistants (PDAs), tablet PCs (personal computers), cell phones etc.

As is well known in the industry, a portable computing device may feature a scaled-down keyboard, a stylus (or pen), or both a keyboard and a pen. For example, a tablet PC is a fully-functional PC equipped with a sensitive screen designed to interact with a complementary pen. The pen is used to select, drag and open files as well as to handwrite notes. The Tablet PC includes software that translates the handwritten notes to computer readable data.

Generally, a user uses both hands when interacting with a tablet PC. One hand may be used to hold the tablet PC while the other may be used to interact with the tablet PC. As with any other computer systems, the user may have more than one window opened on the tablet PC. In such cases, it can be rather cumbersome to move windows around on the screen.

Thus, what is needed is a system, computer program product and method of moving windows from one location to another on a screen of a portable computing device using motion.

SUMMARY OF THE INVENTION

The present invention provides a system, computer program product and method of manipulating windows on portable computing devices through motion. In accordance with the teachings of the invention, when windows are displayed on a screen of a computing device and the device is tilted, a determination is made as to which direction the device is tilted. In response to determining the direction to which the computing device is tilted, the displayed windows will be moved toward the determined direction. For the windows to be moved, however, the computing device must be in a window manipulation mode or WMM. Further, the greater the amount of tilt the faster the displayed windows are moved toward the direction of tilt.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The invention will be explained using a tablet PC. However, it should be understood that the present invention is not restricted to only tablet PCs. Any portable computing device, including conventional computer systems such as laptops, falls within the realm of the invention. Thus, the use of a tablet PC in explaining the invention is only for illustrative purposes.

Figure 1A:
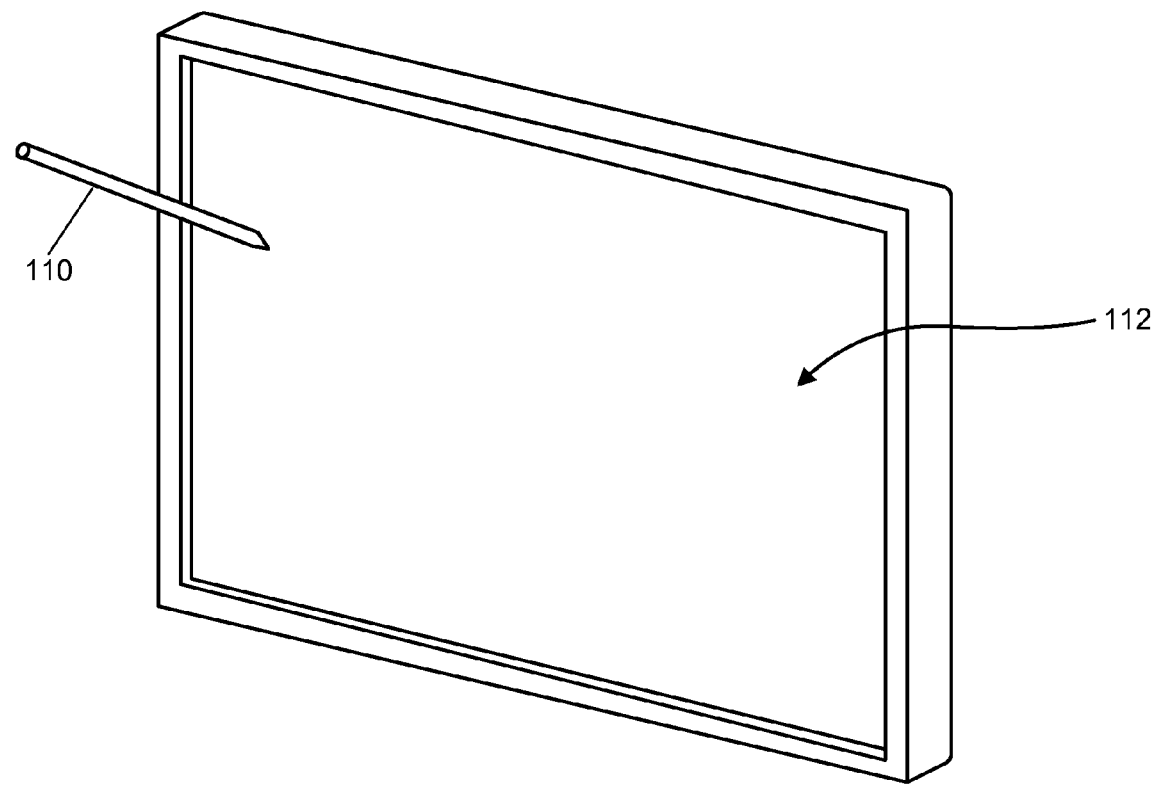
FIG. 1a illustrates an exemplary tablet PC.

FIG. 1a illustrates an exemplary tablet PC 100. The tablet PC 100 comprises a display screen 112 on which a user may write using an appropriate stylus pen 110. The tablet PC 100 may be used as a user's primary personal computer as well as a note-taking device. As mentioned before, the pen 110 may be applied directly on the screen just as one would a conventional computer mouse to select, drag and open files, as well as to handwrite notes. By enabling a user to interact directly with the screen, rather than with a mouse and keyboard, the tablet PC becomes more comfortable and easy to use. For example, the tablet PC can be used while standing up, which is ideal for professionals such as doctors, foremen, sales managers etc.

When one or more windows are opened on the screen 112, a user may want to move the opened windows to one location of the screen 112. This may provide an uncluttered area on the screen where a new window may be opened for example. In such a case, the user may depress a button to put the tablet PC 100 in a "window-move-mode" (i.e., WMM).

Figure 1B:
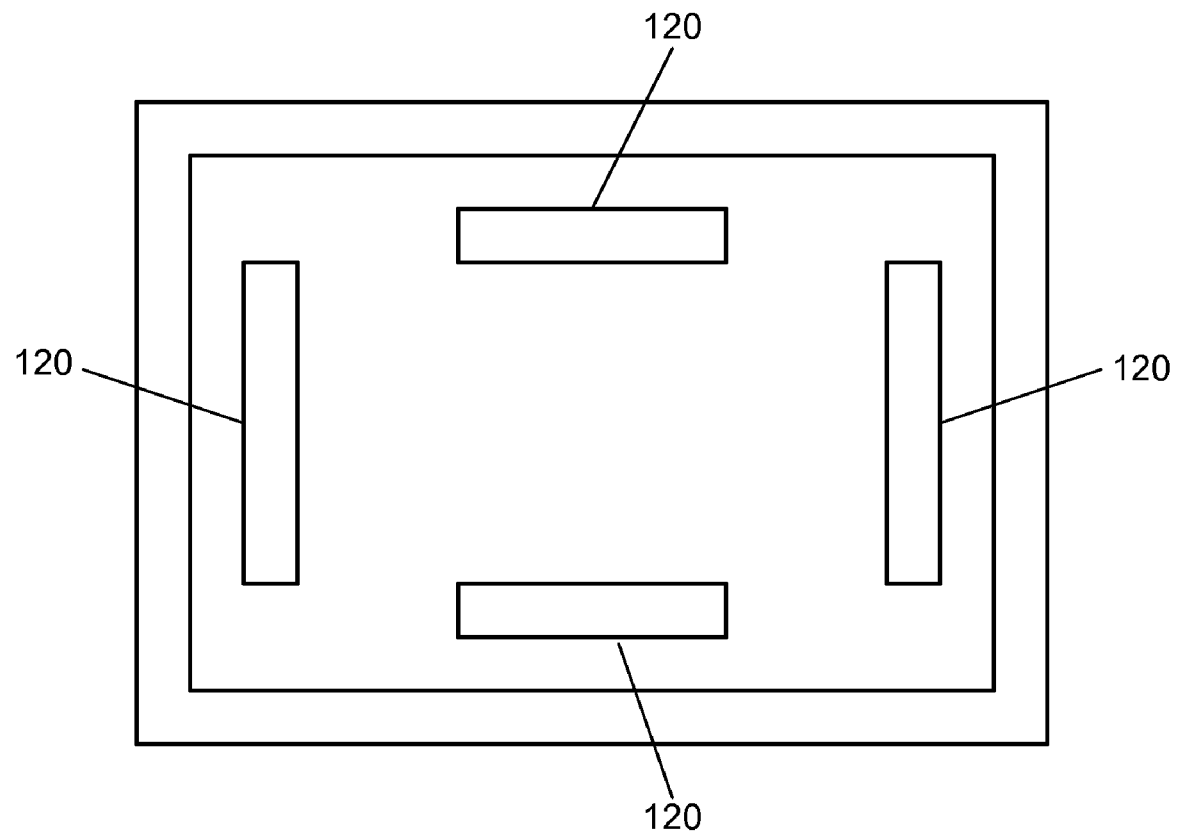
FIG. 1b depicts an exemplary WMM button that may be used to put the tablet PC in WMM.

FIG. 1b depicts an exemplary WMM button 120 that may be used to put the tablet PC 100 in WMM. The WMM button 120 is conveniently placed on the back of the tablet PC 100. All four sides of the tablet PC have a WMM button 120. Thus, whether a user is right-handed or left-handed or holding the tablet PC 100 in landscape or portrait position, the user will have easy access to a WMM button 120.

Note that although the WMM button is placed on the back of the table PC 100, it is not thus restricted. The WMM button 120 may be placed anywhere that is conveniently accessible to a user on a tablet PC 100 whether in front, back or sides of a tablet PC 100 or a combination thereof. Further, there can be anywhere from one to as many WMM buttons 120 as can be conveniently used to implement the invention. Thus, the four WMM buttons 120 on the back of the tablet PC 100 are used for illustrative purposes only.

When a user wants to put the tablet PC 100 in WMM, the user needs only depress one of the buttons 120. Alternatively, if WMM button 120 is designed to be toggled on and off, the user may put the tablet PC 100 in WMM by toggling the WMM button 120 on and turn off WMM by toggling the WMM button 120 off.

When the tablet PC 100 is in WMM, motion sensors or tilt detectors in the tablet PC 100 will sense any tilting movement from the position at which the tablet PC 100 was at the time the tablet PC 100 was placed in WMM. The tilting movement will be reported to a processor in the form of displaced angles which the processor will use to move the windows. The greater the displaced angle, the greater the rate at which the processor will move the windows toward the tilt direction.

A tablet PC 100 may be moved in any direction in three-dimensional space. Thus, the tablet PC 100 may include three tilt detectors. A first tilt detector may be used to sense displacement angles in a first plane (e.g., the plane represented by the x-axis). A second tilt detector may be used to sense displacement angles in a second plane (e.g., the plane represented by the y-axis) and a third tilt detector may be used to sense displacement angles in a third plane (e.g., the plane represented by the z-axis).

Note that the tilt detectors may alternatively be designed to report the position of the tablet PC 100 at the moment the WMM button 120 is depressed. In this case, if the tablet PC 100 is not at the (0,0,0) plane, the processor may then move the windows accordingly.

Tilt detectors are well known in the field. For example, tilt detectors are used in games such as Wii (a product of Nintendo Corporation). Further, the use of tilt detectors to provide commands to computing devices is explained in *A Passive-style Buttonless Mobile Terminal* by Youichi Horry et al., IEEE Transactions on Consumer Electronics, vol. 49, no. 3, August 2003. In addition, the design of a tilt detector is disclosed in *A Tilt Detector* by Hua Zhou, Circuit Cellar Motorola Flash Innovation 2003 Design Contest, Innovate with HC08 from Motorola, Jun. 30, 2003. A copy of the disclosure of *A Passive-style Buttonless Mobile Terminal* and a copy of an Abstract of *A Tilt Detector* are provided in an IDS filed concurrently with the present application. The disclosure of both references is herein incorporated by reference.

In certain instances, a user may not want to move all the windows on a screen at the same time. In such cases, the user may indicate any window that is to be held in place by either using the pen 110 to select the window or by touching the screen over the window to select the window. Once selected and if the tablet PC 100 is in WMM and tilted or tilting, the window will be held in place while the other windows are moved from one location on the screen to another. Specifically, when the tablet PC 100 is in WMM and a window is selected by touching the screen 112 over the displayed window either with the pen 110 or by a finger (i.e., a thumb), for instance, the selected window will not move while other windows may be moving toward a destination location. Note that any number of windows may be selected at any time while the tablet PC is in WMM. Note further that a selected window may be deselected at any time by removing the thumb or pen on the screen over the window.

Figure 2:
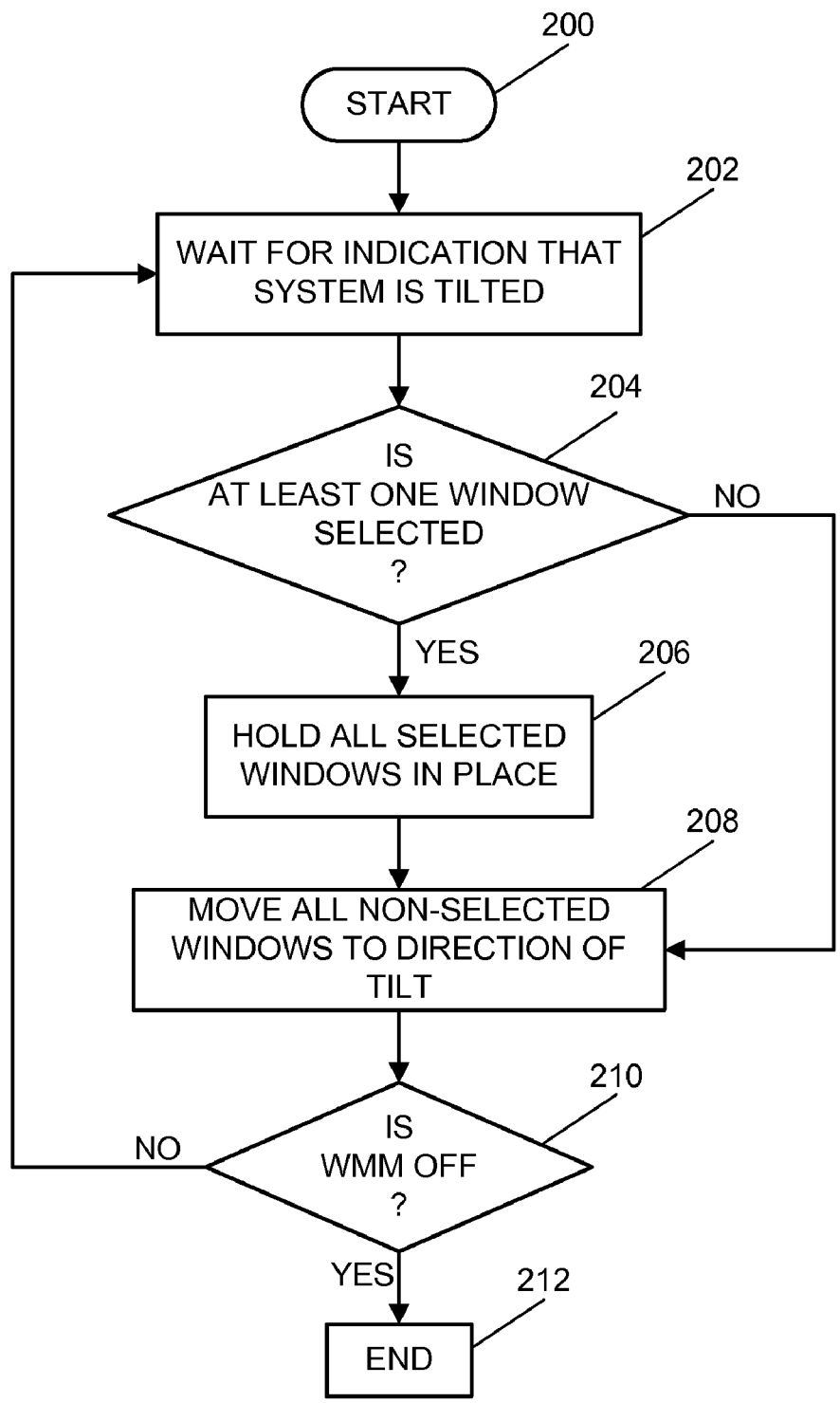
FIG. 2 is a flowchart of a process that is used to implement the invention.

FIG. 2 is a flowchart of an exemplary process that implements the invention. When a user depresses any one of the WMM buttons 120, the tablet PC 100 (i.e., the system) enters in WMM at which time an interrupt occurs and the process begins (step 200). Note that if two or more buttons 120 are depressed, the first one to be depressed controls the process. If two or more WMM buttons 120 are depressed at the same time, the system may choose one of the buttons as the controlling one. Alternatively, if two or more buttons are depressed, the tablet PC 100 will remain in WMM until all the buttons 120 are released.

In step 202, the process waits for tilt indications. As mentioned above when the tablet PC 100 is in WMM, tilt detectors (see tilt detectors 324 in FIG. 3) make the determination as to whether the system is tilted as well as in which direction it is tilted and provide displaced angles to a processor (i.e., processor 302 in FIG. 3). Thus, as soon as the tablet PC is in WMM, an angle of displacement in each of the three planes (i.e., in relation to the position of the tablet PC in the x-axis, y-axis and z-axis) will be provided to the processor. Any reported displaced angle, other than (0,0,0), is a tilt indication.

When the process gets the tilt indication, in step 204 it checks to see whether at least one window has been selected to be held in place. If so, in step 206, the process holds all selected windows in place while moving all non-selected windows toward the direction of tilt (step 208). If the process finds that no windows were selected to be held in place, the process just moves all windows toward the direction of tilt by jumping straight to step 208 from step 204 bypassing step 206.

Again as mentioned above, the rate at which the windows are moved depends on the indicated angle of displacement. As an implementation, a table may be used in which degrees of displacement angles are cross-referenced to distances (e.g., number of pixels) at which to move windows on the screen. Thus, upon receiving an angle of displacement, the process can consult the table to obtain the distance at which to move each one of the windows on the screen and move each window accordingly.

In step 210, the process checks to see if the user has released the controlling WMM button 120 (i.e., is WMM off?). As mentioned above, in an alternative embodiment, the user may have to release all WMM buttons 120 in order to turn off WMM. If WMM is turned off, the process ends in step 212. If the user has not turned off WMM, the process jumps back to step 202 where a determination is made as to whether the tablet PC 100 is still in a tilt position. If so, the steps above are repeated. If not, the process waits for further tilt indications.

Figure 3:
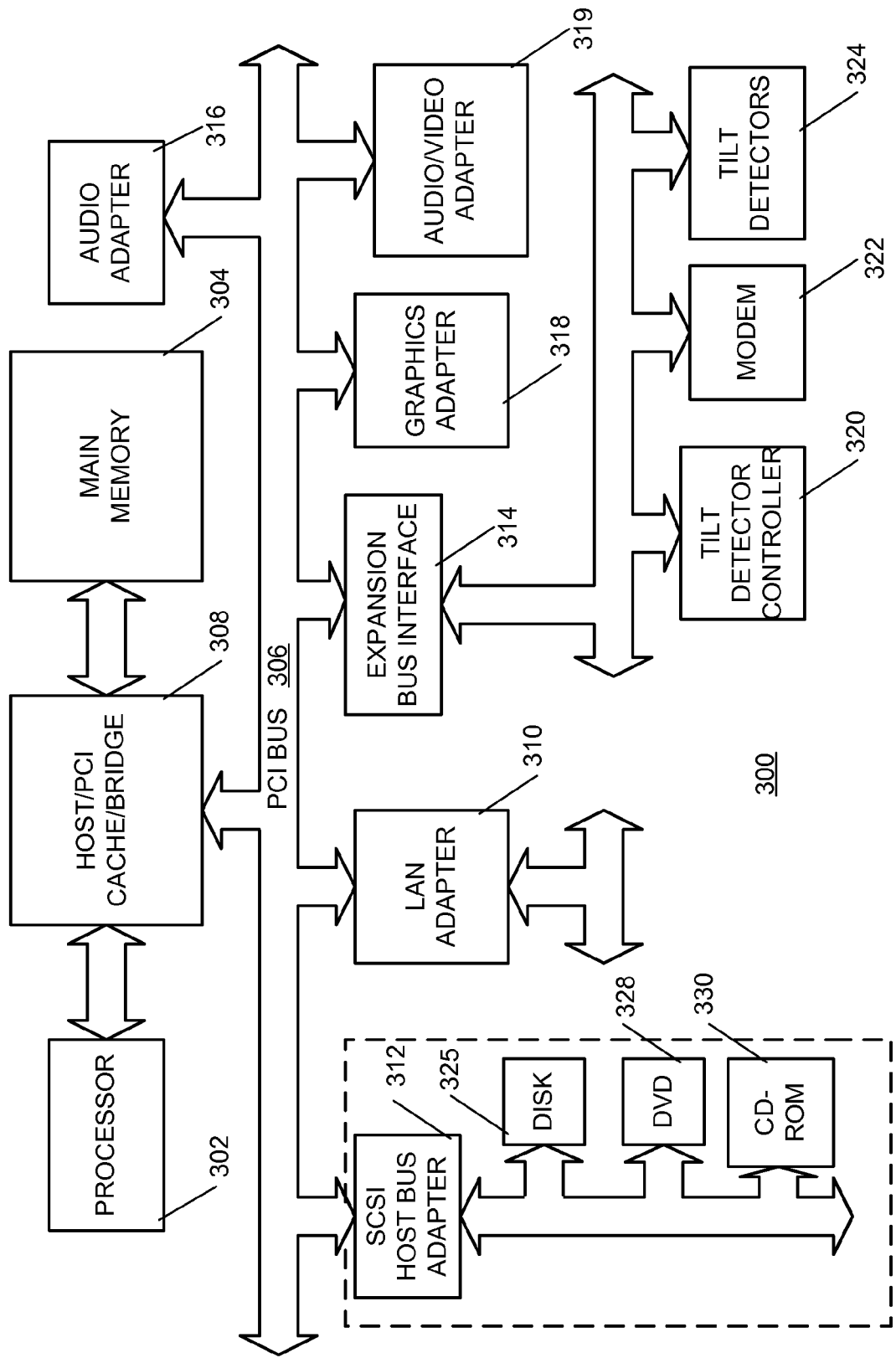
FIG. 3 is an exemplary block diagram of a tablet PC.

With reference now to FIG. 3, a block diagram illustrating a data processing system is depicted in which the present invention may be implemented. Data processing system 300 is an example of a tablet PC 100. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a tilt detector controller 320, modem 322, and tilt detectors 324. As mentioned before, the tablet PC 100 includes three tilt detectors. Thus, tilt detectors 324 encompass all three tilt detectors.

SCSI host bus adapter 312 provides a connection for hard disk drive 326, DVD drive 328, and CD-ROM drive 330. Typical PCI local bus implementations will support three or four PCI expansion slots or add-in connectors. Note that some of the hardware may be through a docking station. For example, the DVD drive 328, audio/video adapter 319 may be incorporated into the tablet PC 100 through the docking station. Further, USB 2.0, FireWire, and VGA ports may also be provided through the docking station.

An operating system runs on processor 302 and is used to coordinate and provide control of various components within data processing system 300 in FIG. 3. The operating system may be a commercially available operating system, such as Windows XP® Tablet PC Edition operating system, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 may also be a notebook computer or hand held computer as well as a PDA.

The invention can take the form of a computer program product accessible from a computer-usable or computer-readable medium providing program code for use by or in connection with a computer or any other instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and Digital Video/Versatile Disk (DVD).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application and to enable others of ordinary skill in the art to understand the invention for various embodiments with various modifications as are suited to the particular use contemplated.

What is claimed is:

1. A method of manipulating windows on a computing device, the device having a screen on which windows are displayed, the method comprising the steps of:
    determining whether the computing device is tilted;
    in response to determining whether the computing device is tilted, determining to which direction the computing device is tilted;
    in response to determining to which direction the computing device is tilted, determining whether there is at least one displayed window on the
    screen of the computing device; and
    in response to determining there is at least one displayed window, moving the at least one displayed window toward the direction the computing device is tilted.

2. The method of claim 1 wherein speeds at which the displayed window is moved toward the direction the computing device is tilted are correlated to degrees of tilt of the computing device.

3. The method of claim 2 wherein it is determined whether the computing device is tilted if the computing device is in a mode allowing for window manipulation.

4. The method of claim 3 wherein at least one window is selected to remain in place while other windows are moved toward the direction the computing device is tilted.

5. The method of claim 4 wherein a selected window is deselected in order to allow the window to move toward the direction the computing device is tilted.

6. The method of claim 5 wherein the deselected window is moved toward the direction the computing device is tilted if the computing device is tilted after the window is deselected.

7. A computer program product on a computer readable medium having instructions which when executed by a processor manipulate windows on a computing device, the computing device having a screen on which windows are displayed, the instructions comprising instructions for:
    determining whether the computing device is tilted;
    in response to determining whether the computing device is tilted, determining to which direction the computing device is tilted;
    in response to determining to which direction the computing device is tilted, determining whether there is at least one displayed window on the
    screen of the computing device; and
    in response to determining there is at least one displayed Window, moving the at least one displayed window toward the direction the computing device is tilted.

8. The computer program product of claim 7 wherein speeds at which the displayed window is moved toward the direction the computing device is tilted are correlated to degrees of tilt of the computing device.

9. The computer program product of claim 8 wherein it is determined whether the computing device is tilted if the computing device is in a mode allowing for window manipulation.

10. The computer program product of claim 9 wherein at least one window is selected to remain in place while other windows are moved toward the direction the computing device is tilted.

11. The computer program product of claim 10 wherein a selected window is deselected in order to allow the window to move toward the direction the computing device is tilted.

12. The computer program product of claim 11 wherein the deselected window is moved toward the direction the computing device is tilted if the computing device is tilted after the window is deselected.

13. A computing device for manipulating windows, the computing device having a screen on which windows are displayed, the computing device comprising:
    at least one storage device for storing code instructions; and
    at least one processor for processing the code instructions to determine whether the computing device is tilted, to determine to which direction the computing device is tilted in response to determine whether the computing device is tilted, to determine whether there is at least one displayed window on the screen of the computing device in response to determine to which direction the computing device is tilted, and to move the at least one displayed window toward the direction the computing device is tilted in response to determine there is at least one displayed window.

14. The computing device of claim 13 wherein speeds at which the displayed window is moved toward the direction the computing device is tilted are correlated to degrees of tilt of the computing device.

15. The computing device of claim 14 wherein it is determined whether the computing device is tilted if the computing device is in a mode allowing for window manipulation.

16. The computing device of claim 15 wherein at least one window is selected to remain in place while other windows are moved toward the direction the computing device is tilted.

17. The computing device of claim 16 wherein a selected window is deselected in order to allow the window to move toward the direction the computing device is tilted.

18. The computing device of claim 17 wherein the deselected window is moved toward the direction the computing device is tilted if the computing device is tilted after the window is deselected.

* * * * *